(12) United States Patent
Girt et al.

(10) Patent No.: US 7,666,529 B2
(45) Date of Patent: Feb. 23, 2010

(54) ANTI-FERROMAGNETICALLY COUPLED SOFT UNDERLAYER

(75) Inventors: Erol Girt, Berkeley, CA (US); Charles Frederick Brucker, Pleasanton, CA (US); Alexander Yulievich Dobin, Milpitas, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 462 days.

(21) Appl. No.: 11/231,797

(22) Filed: Sep. 22, 2005

(65) Prior Publication Data

US 2007/0065681 A1 Mar. 22, 2007

(51) Int. Cl.
G11B 5/66 (2006.01)
G11B 5/667 (2006.01)

(52) U.S. Cl. .................... 428/828.1; 428/827; 428/828; 428/829; 428/830

(58) Field of Classification Search .................... 360/18
See application file for complete search history.

(56) References Cited

U.S. PATENT DOCUMENTS

| | | | | |
|---|---|---|---|---|
| 4,576,876 | A * | 3/1986 | Shiiki et al. ............... | 428/679 |
| 6,077,586 | A * | 6/2000 | Bian et al. ................. | 428/828 |
| 6,280,813 | B1 * | 8/2001 | Carey et al. ............... | 428/828 |
| 6,372,330 | B1 * | 4/2002 | Do et al. .................... | 428/212 |
| 2002/0028356 | A1 * | 3/2002 | Kawato et al. ........ | 428/694 TM |
| 2002/0028357 | A1 * | 3/2002 | Shukh et al. .......... | 428/694 TM |
| 2002/0076579 | A1 * | 6/2002 | Hanawa et al. ........ | 428/694 TS |
| 2003/0035973 | A1 * | 2/2003 | Trindade et al. ............. | 428/494 |
| 2004/0062953 | A1 * | 4/2004 | Futamoto et al. ....... | 428/694 TS |
| 2004/0137278 | A1 | 7/2004 | Uwazumi et al. | |
| 2005/0244679 | A1 | 11/2005 | Arai et al. | |

FOREIGN PATENT DOCUMENTS

| | | |
|---|---|---|
| JP | 58166531 | 10/1983 |
| JP | 2004118894 | 4/2004 |
| WO | 2003/049086 A1 | 6/2003 |

OTHER PUBLICATIONS

W.Ervens and H. Wilmesmeier. Ullmann's Encyclopedia of Industrial Chemistry, Magnetic Materials. DOI: 10.1002/14356007. a16_001. Article Online Posting Date: Jun. 15, 2000.*
Acharya, B.R.; Zhou, J.N.; Zheng, M.; Choe, G.; Abarra, E.N.; Johnson, K.E., "Anti-parallel coupled soft under layers for high-density perpendicular recording," Magnetics, IEEE Transactions on , vol. 40, No. 4, pp. 2383-2385, Jul. 2004.*

(Continued)

*Primary Examiner*—David R Sample
*Assistant Examiner*—April C Inyard
(74) *Attorney, Agent, or Firm*—Shumaker & Sieffert, P.A.

(57) ABSTRACT

A magnetic recording medium having a first magnetic layer, a spacer layer, and a second magnetic layer, in this order, wherein the spacer layer includes a non-magnetic layer and a thickness of the spacer layer is selected to establish anti-ferromagnetic coupling between the first magnetic layer and the second magnetic layer, and a thickness of both the first and second magnetic layers are less than a critical thickness for formation of stripe domains in the magnetic layers is disclosed.

16 Claims, 11 Drawing Sheets

OTHER PUBLICATIONS

Kong, S.H.; Okamoto, T.; Nakagawa, S., "Soft magnetic underlayer with multilayer structure for penpendicular magnetic recording media," Magnetics, IEEE Transactions on , vol. 39, No. 5, pp. 2338-2340, Sep. 2003.*

Kikukawa, A.; Honda, Y.; Hirayama, Y.; Futamoto, M., "Noise characteristics of double-layered perpendicular media using novel soft magnetic underlaryer materials," Magnetics, IEEE Transactions on , vol. 36, No. 5, pp. 2402-2404, Sep. 2000.*

* cited by examiner (a)

Longitudinal Recording Bits (b)

Perpendicular Recording Bits

FML=Ferromagnetic layer (a)

(b)

(c)

(d)

$J_{ex}(1) \geq J_{ex}(2) \geq J_{ex}(3) \geq ...$

ANTI-FERROMAGNETICALLY COUPLED SOFT UNDERLAYER

FIELD OF INVENTION

This invention relates to perpendicular recording media, such as thin film magnetic recording disks having perpendicular recording, and to a method of manufacturing the media. The embodiments of the invention have particular applicability to perpendicular media having an anti-ferromagnetically coupled soft underlayer.

BACKGROUND

Perpendicular magnetic recording systems have been developed for use in computer hard disc drives to provide higher liner density than longitudinal recording. FIG. 1, obtained from *Magnetic Disk Drive Technology* by Kanu G. Ashar, 322 (1997), shows magnetic bits and transitions in longitudinal and perpendicular recording. In a longitudinal recording there exists a demagnetization field between two magnetic bits. These demagnetization fields tend to separate bits, making transition space between bits, that is, transition parameter a, large as shown in FIG. 1(a). At very high bit densities, the limiting parameter may be the length of the transition region. Perpendicular recording bits do not face each other, and hence they can be written at closed distances as shown in FIG. 1(b).

A typical perpendicular recording head includes a trailing read/write pole, a leading return or opposing pole magnetically coupled to the read/write pole, and an electrically conductive magnetizing coil surrounding the yoke of the write pole as shown in FIG. 2, *Magnetic Disk Drive Technology* by Kanu G. Ashar, 323 (1997). Perpendicular recording media may include magnetic media and an underlayer as shown in FIG. 2. The magnetic media could be a hard magnetic recording layer with vertically oriented magnetic domains and the underlayer could be a soft magnetic underlayer to enhance the recording head fields and provide a flux path from the trailing write pole to the leading or opposing pole of the writer. The magnetic flux passes from the write pole tip, through the hard magnetic recording track, into the soft underlayer (SUL), and across to the opposing pole. Such perpendicular recording media may also include a thin interlayer between the hard recording layer and the soft underlayer to prevent exchange coupling between the hard and soft layers. The soft underlayer helps also during the read operation. During the read back process, the soft underlayer produces the image of magnetic charges in the magnetically hard layer, effectively increasing the magnetic flux coming from the medium. This provides a higher playback signal.

The soft underlayer is located below a recording layer and forms a mirror image of the recording head. Together with the image head, there are essentially two heads involved in each recording event; thus, the net recording field becomes fairly large compared to the field generated with a longitudinal head. Magnetic flux flows from head through the SUL to return pole crossing twice through the recording layer. The return pole is generally much wider than the writing pole in order to dilute the magnetic flux intensity flow back through the recording layer. In spite of this, it is sometimes found that writing also occurs at the return pole, with the consequence that data can be partially erased not only on the track being recorded, but also on an adjacent track resulting in unintentional erasure of data stored in the recording layer. The quality of the image, and therefore the effectiveness of the soft underlayer, and erasure of data both depend on the permeability of the soft underlayer. Thus, there is a need for a perpendicular recording medium having a soft underlayer that forms a good mirror image of the recording head without erasure of data in the recording layer.

SUMMARY OF THE INVENTION

The embodiments of the invention are directed to a perpendicular recording medium having a SUL structure having an anti-ferromagnetically coupled SUL design. This design allows adjusting the permeability of the SUL independent of the SUL saturation magnetization to substantially prevent erasure of recording layer without compromising writability.

As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

Figure 1:
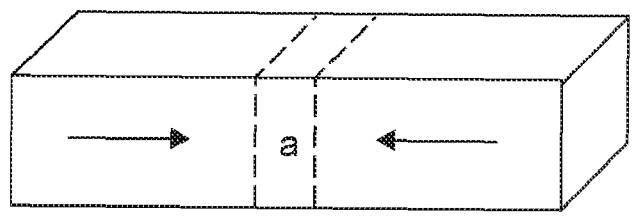
FIG. 1 shows (a) longitudinal and (b) perpendicular recording bits.
Figure 1:
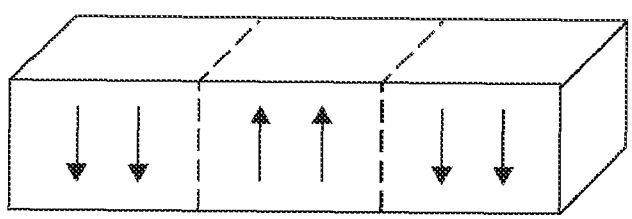
Figure 2:
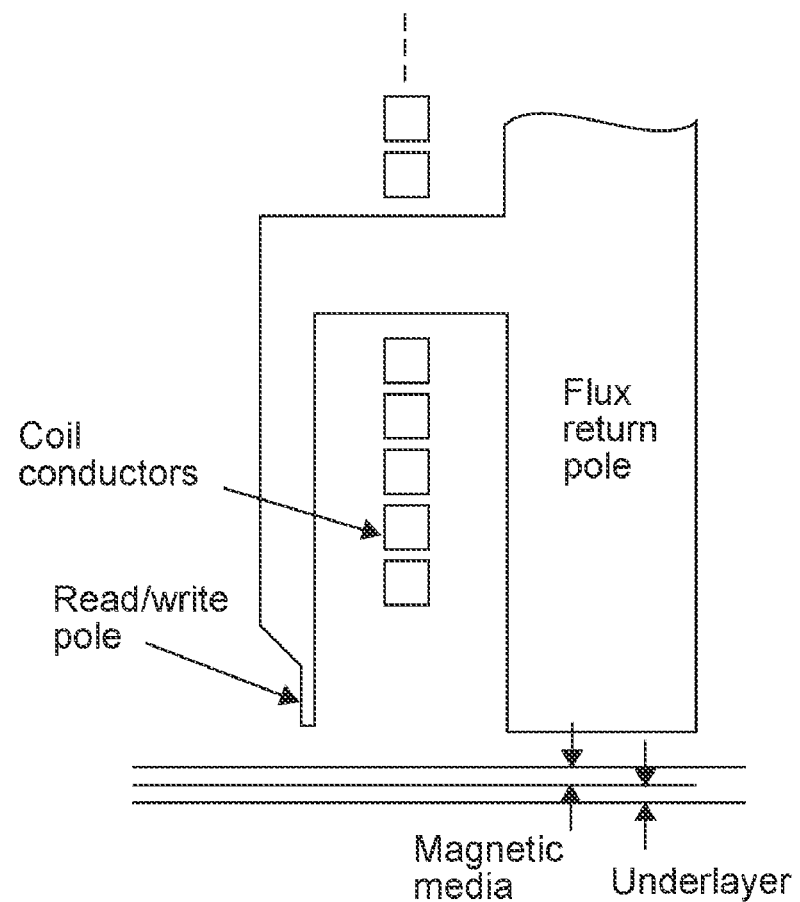
FIG. 2 is a schematic of a perpendicular pole head with magnetic media and underlayer.

A perpendicular recording medium could have ferromagnetic and antiferromagnetic coupling in a soft magnetic underlayer of the perpendicular recording medium. The embodiments of the invention provide an antiferromagnetic coupling in a soft magnetic underlayer of the perpendicular recording medium. The embodiments of the invention are particularly suitable for use with a magnetic disc storage system with a recording head having a head capable of performing read and/or write operations. Ferromagnetic coupling generally refers to indirect coupling between ferromagnetic layers or multilayer structures such that adjacent ferromagnetic layers or multilayer structures have magnetizations that point in generally the same directions. Antiferromagnetic coupling generally refers to the coupling between ferromagnetic layers or multilayer structures such that adjacent ferromagnetic layers or multilayer structures have magnetizations that point in generally opposite directions.

The AF coupling was evaluated by measuring $J_{ex}$, the exchange energy density of the system, which represents the strength of antiferromagnetic coupling between two magnetic layers. In the embodiments of this invention, there is antiferromagnetic coupling between ferromagnetic layers or multilayer structures such that adjacent ferromagnetic layers or multilayer structures when the value of $J_{ex}$ between ferromagnetic layers or multilayer structures such that adjacent ferromagnetic layers or a multilayer structure is greater than zero erg/cm$^2$.

The preferred embodiment of the perpendicular medium of this invention allows the SUL permeability to be controlled independent of the SUL saturation magnetization such that erasure of data in the magnetic layer is substantially prevented without compromising writability. If one changes the strength of RKKY interaction between magnetic layers in SUL one automatically changes the permeability of SUL (larger coupling, lower permeability). The reduction in permeability would decrease writability and at the same time reduce erasure. So there is an optimum point for which erasure can be significantly reduced without decreasing writability significantly. So changing permeability is one way to optimize media performance by changing erasure and writability.

The embodiments of the invention provide magnetic recording media suitable for high areal recording density exhibiting high SMNR. The embodiments of the invention achieve such technological advantages by forming a soft underlayer. A "soft magnetic material" is a material that is easily magnetized and demagnetized. As compared to a soft magnetic material, a "hard magnetic" material is one that neither magnetizes nor demagnetizes easily.

The underlayer is "soft" because it is made up of a soft magnetic material, which is defined above, and it is called an "underlayer" because it resides under a recording layer. In a preferred embodiment, the soft layer is amorphous. The term "amorphous" means that the material of the underlayer exhibits no predominant sharp peak in an X-ray diffraction pattern as compared to background noise. The "amorphous soft underlayer" of the embodiments of the invention encompasses nanocrystallites in amorphous phase or any other form of a material so long the material exhibits no predominant sharp peak in an X-ray diffraction pattern as compared to background noise.

When soft underlayers are fabricated by magnetron sputtering on disk substrates, there are several components competing to determine the net anisotropy of the underlayers: effect of magnetron field, magnetostriction of film and stress originated from substrate shape, etc. The first and second soft magnetic underlayers can be fabricated as single layers or a multilayer.

The soft magnetic layer could be deposited from targets manufactured by a gas atomized alloyed powder process (AP) or by a molten material casting into a mold at a temperature between 1200 to 1550° C., and solidifying into an ingot. The ingot could then pre-heated to a temperature between 850 and 1200° C. in an annealing furnace suitable for rolling to desired thickness for final machining to precise target size.

A seedlayer is a layer lying in between the substrate and the underlayer. Proper seedlayer can also control anisotropy of the soft underlayer by promoting microstructure that exhibit either short-range ordering under the influence of magnetron field or different magnetostriction. A seedlayer could also alter local stresses in the soft underlayer.

Preferably, in the underlayer of the perpendicular recording medium of the embodiments of the invention, an easy axis of magnetization is directed in a direction substantially transverse to a traveling direction of the magnetic head. This means that the easy axis of magnetization is directed more toward a direction transverse to the traveling direction of the read-write head than toward the traveling direction. Also, preferably, the underlayer of the perpendicular recording medium has a substantially radial or transverse anisotropy, which means that the domains of the soft magnetic material of the underlayer are directed more toward a direction transverse to the traveling direction of the read-write head than toward the traveling direction. In one embodiment, the direction transverse to the traveling direction of the read-write head is the direction perpendicular to the plane of the substrate of the recording medium.

In accordance with embodiments of this invention, the substrates that may be used in the embodiments of the invention include glass, glass-ceramic, NiP/aluminum, metal alloys, plastic/polymer material, ceramic, glass-polymer, composite materials or other non-magnetic materials. Glass-ceramic materials do not normally exhibit a crystalline surface. Glasses and glass-ceramics generally exhibit high resistance to shocks.

A preferred embodiment of this invention is a perpendicular recording medium comprising at least two amorphous soft underlayers with a spacer layer between the underlayers and a recording layer. The amorphous soft underlayer should preferably be made of soft magnetic materials and the recording layer should preferably be made of hard magnetic materials. The amorphous soft underlayer is relatively thick compared to other layers. Any layer between the amorphous soft underlayer and the recording layer is called an interlayer or an intermediate layer. An interlayer can be made of more than one layer of non-magnetic materials. The purpose of the interlayer is to prevent an interaction between the amorphous soft magnetic underlayer and recording layer. An interlayer could also promote the desired properties of the recording layer. Longitudinal recording media do not have an amorphous soft magnetic underlayer. Therefore, the layers named as "underlayer," "seed layer," "sub-seed layer," or "buffer layer" of longitudinal media are somewhat equivalent to the intermediate layer(s) of perpendicular media.

The underlayer and magnetic recording layer could be sequentially sputter deposited on the substrate, typically by magnetron sputtering, in an inert gas atmosphere. A carbon overcoat could be typically deposited in argon with nitrogen, hydrogen or ethylene. Conventional lubricant topcoats are typically less than about 20 Å thick.

A seedlayer, which could be optionally added as a layer lying in between the substrate and the soft underlayer, can often control anisotropy of the soft underlayer by promoting microstructure that exhibit either short-range ordering under the influence of magnetron field or different magnetostriction. A seedlayer could also alter local stresses in the soft underlayer.

Amorphous soft underlayers could produce smoother surfaces as compared to polycrystalline underlayers. Therefore, amorphous soft underlayer could be one way of reducing the roughness of the magnetic recording media for high-density perpendicular magnetic recording. The amorphous soft underlayer materials include a Cr-doped Fe-alloy-containing underlayer, wherein the Fe-alloy could be CoFeZr, CoFeTa, FeCoZrB and FeCoB.

Another advantage of amorphous materials as soft underlayer materials is the lack of long-range order in the amorphous material. Without a long-range order, amorphous alloys have substantially no magnetocrystalline anisotropy. The use of amorphous soft underlayer could be one way of reducing noise caused by ripple domains and surface roughness. The surface roughness of the amorphous soft underlayer is preferably below 1 nm, more preferably below 0.5 nm, and most preferably below 0.3 nm.

In accordance with the embodiments of the invention, the test methods for determining different parameters are as follows. If a particular test method has not been explicitly stated below to determine a parameter, then a conventional method used by persons of ordinary skill in this art could be used to determine that parameter.

Writability: In the embodiments of this invention, the preferred range of writability includes high values.

Remanent magnetization: In the embodiments of this invention, the preferred range of saturation magnetization is 0.3 to 1 memu/cm$^2$, more preferably, 0.4 to 0.7 memu/cm$^2$.

Magnetostriction, $\lambda_s$: In the embodiments of this invention, the preferred range of $\lambda_s$ is depends on the SUL composition. For example, $\lambda_s$ (x10$^{-5}$) could in the range about 5.2 to 4.4 when boron content increases from about 8 to 12 at. %.

Stress, $\sigma$: In the embodiments of this invention, the preferred range of $\sigma$ depends on sputtering conditions. For example, $\sigma$ can vary in the range from about −400 to about 800 MPa when the sputtering pressure increases from about 2 to 12 mTorr, and then decrease to about 400 MPa when the sputtering pressure is further increased to about 15 mTorr. See C. L. Platt, M. K. Minor, T. J. Klemmer, "Magnetic and structural properties of FeCoB thin films", IEEE Trans. Magn., vol. 37, pp. 2302-2304, July 2001.

Stripe domain: They introduce noise so SUL should be without stripe domains. Stripe domains are stripe structures in an otherwise optically smooth film of SUL. Strip domain is measured by using Magnetic Force Microscopy (MFM) with soft magnetic tips magnetized perpendicular to the sample plane.

$J_{ex}$: Exchange energy density—describes strength of RKKY interaction. In this invention, the preferred value of $J_{ex}$ is greater than zero erg/cm$^2$, more preferably greater than 2 erg/cm$^2$. More preferably between 0 and 0.5 erg/cm$^2$. Even more preferably between 0 and 0.2 erg/cm$^2$.

Signal to media noise ratio (SMNR): In the embodiments of this invention, the preferred range of SMNR includes high values.

Reverse overwrite (rev OW): In the embodiments of this invention, the preferred range of rev OW includes high values.

Erasure: In the embodiments of this invention, the preferred range of erasure includes low values.

Figure 3:
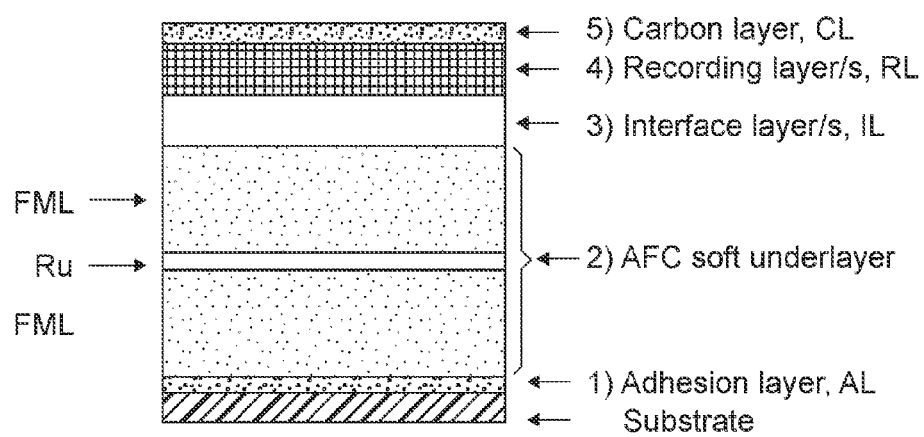
FIG. 3 is a schematic of an embodiment of a perpendicular recording medium of this invention with a film structure having a substrate, an adhesion layer, an AFC soft underlayer, a non-magnetic interlayer, a recording layer, and a carbon layer.
Figure 4:
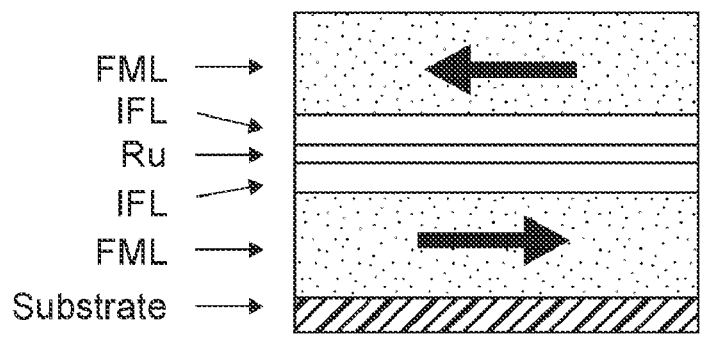
FIGS. 4(a)-(d) show different embodiments of AFC SUL structures with FML—ferromagnetic layer, SL—spacer layer, IFL—interface layer, Ru—ruthenium layer.
Figure 4:
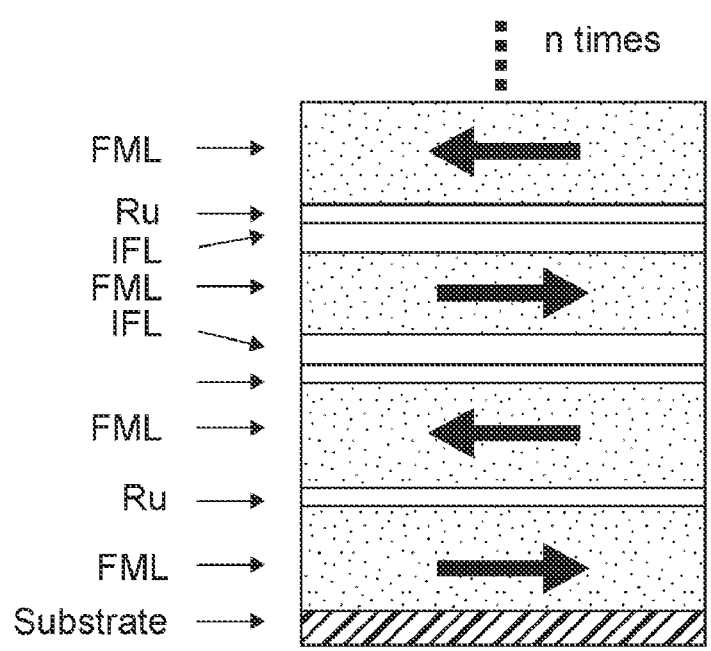
Figure 4:
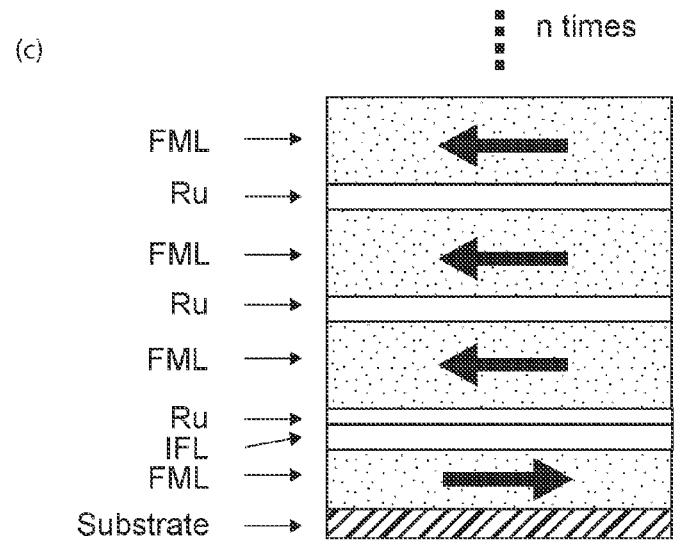
Figure 4:
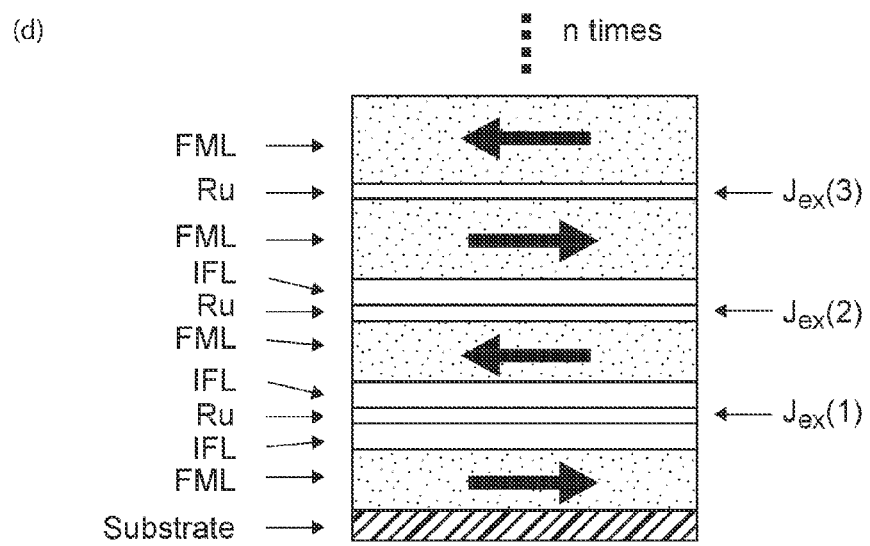

A preferred embodiment of a perpendicular recording medium of this invention is shown in FIG. 3. The layer structure of the preferred embodiment is as follows: Substrate, adhesion layer (1), anti-ferromagnetically coupled (AFC) soft underlayer (2), non-magnetic interlayer/s (3), recording layer/s (4), and carbon layer (5). Preferably, the AFC soft underlayer comprises a first soft underlayer, a spacer layer, and a second soft underlayer. Protective carbon layer 5 typically covers the magnetic recording layer 4.

The adhesion layer could comprise Cr, CrTi, Ti, and NiNb among other adhesion promoting materials. The thickness of adhesion layer 1 is in the range of about 0.5 nm, preferably in the range of about 10 nm.

The anti-ferromagnetically coupled soft underlayer (AFC SUL) comprises least two ferromagnetic layers (FML) that are anti-ferromagnetically coupled across a non-magnetic spacer layer (SL).

The AFC SUL could have several different possible structures as follows:
(1) FML/SL/FML (thickness of SL adjusted to establish anti-ferromagnetic coupling between FML);
(2) FML/IFL/SL/FML or FML/SL/IFL/FML or FML/IFL/SL/IFL/FML (IFL—interface layer used to enhance anti-ferromagnetic coupling between FML) (thickness of SL adjusted to establish anti-ferromagnetic coupling between FML);
(3) FML/IFL/nx[SL/IFL/FML] (n=2 to 20) (thickness of SL adjusted to establish anti-ferromagnetic coupling between FML) (IFL may or may not be present);
(4) FML$_1$/IFL/nx[SL$_i$/IFL/FML$_{i+1}$] (n=2 to 20) (example: FML$_1$/SL$_1$/FML$_2$/SL$_2$/FML$_3$/SL$_3$/FML$_4$...) (thickness of SL$_i$ can vary from 0 to 2.5 to establish all ranges of coupling between FML$_i$ and at least one SL$_i$ is adjusted to establish anti-ferromagnetic coupling between FML$_i$ and FML$_{i+1}$) (IFL may or may not be present); and
(5) FML$_1$/IFL/nx[SL$_i$/IFL/FML$_{i+1}$](n=2 to 20) (example: FML$_1$/SL$_1$/FML$_2$/SL$_2$/FML$_3$/SL$_3$/FML$_4$...) (thickness of SL$_i$ is adjusted so that anti-ferromagnetic coupling strength between FML$_i$ and FML$_{i+1}$, J$_{ex}$(i), varies across AFC SUL from weak near the layer 4 to strong near the substrate) (IFL may or may not be present). Some of the embodiments of the structures of AFC SUL are shown in FIGS. 4(a)-(d).

The ferromagnetic soft underlayer could comprise an alloy material selected from the group consisting of Fe with one or more elements selected from Co, B, P, Si, C, Zr, Nb, Hf, Ta, Al, Si, Cu, Ag, Au. The thickness of the first or second soft magnetic underlayer (FML) is preferably in the range of 5-400 nm, more preferably, in the range of about 40-150 nm.

Note that large magnetostriction, $\lambda_S$, and stress, $\sigma$, in FML can generate perpendicular anisotropy (because $K_u = 3/2\lambda_S\sigma$, where Ku refers to uniaxial anisotropy) that can induce formation of stripe domains if thickness of FML exceeds some critical value. During the course of this invention, it was found that anti-ferromagnetic coupling between FML can suppress the formation of stripe domains in FML. Moreover, it was observed that the critical thickness of FML, i.e., the thickness at which stripe domains are formed in FML, increases if the strength of anti-ferromagnetic coupling increases.

The spacer layer could comprise nearly any non-magnetic composition, but may include Ru, Rh, Ir, Cr, Cu, Re, V and their alloys. The thickness of the spacer layer is in the range of about 0.1-2.5 nm, preferably in the range of about 0.3-1 nm.

The interface layer (IFL) could comprise Co, Fe, B, P, Si, C, Zr, Nb, Hf, Ta, Al, Si, Cu, Ag, Au and their alloys. Magnetization saturation of this layer should preferably be at least 800 emu/cm$^3$. The thickness of interface layer is in the range of about 0.1-10 nm, preferably in the range of about 0.5-2 nm.

Preferably, the interlayer should be such that it sets the growth of the recording layer. For example, this layer may include one or more layers with fcc or/and hcp crystallographic structure and has the following composition: one or more elements selected from Ru, Re, Ir, Cu, Ag, Au, Zr, Hf, Pr, Pd and Ti with a minor amounts of bcc-structured elements selected from the group consisting of W, Mo, Ta, Nb, Cr, and V. The thickness of the interlayer is in the range of about 0.2 nm to 40 nm, preferably in the range of about 4-12 nm.

The recording layer could be of one or more magnetic layers. The recording layer could be grown in controlled atmosphere, in general Ar or combination of Ar and O$_2$. This layer may be grown at low temperatures, below 400 K (in general this temperature range is used for magnetic layers that are sputtered in combination of Ar and $O_2$ atmosphere), or may be grown at elevated temperatures, in general above 420 K and below 600 K. The recording layer may include Co with one or more added elements selected from B, C, Si, Ti, V, Cr, Mn, Fe, Ni, Cu, Ge, Zr, Nb, Mo, Ru, Rh, Pd, Ag, Hf, Ta, W, Re, Ir, Pt, Au, B, and C. This layer may also include at least one oxide material selected from group consisting of B, Mg, Si, Ti, V, Cr, Mn, Fe, Co, Ni, Cu, Ge, Y, Zr, Nb, Mo, Ru, Rh, Pd, Ag, Hf, Ta, W, Re, Ir and Pt oxides. For example, CoCrPt+ $SiO_2$ The thickness of magnetic layer 4 is in the range of about 4 to 30 nm, preferably in the range of about 8 to 20 nm.

Optionally, amorphous layer (AmL) may be present, for example, if layer 2 is not amorphous. This layer can include a magnetic or non-magnetic material having a composition for which these materials are amorphous, for example: FeCoB, CZN, $Ti_\delta Cr_{100-\delta}$, $Ta_\delta Cr_{100-67}$ ($30<\delta<60$), NiTa, NiNb, NiP, and CrZr. The thickness of the optional amorphous layer is in the range of about 0-10 nm, preferably, about 0.2-20 nm.

The advantageous characteristics attainable by the embodiments of the invention are illustrated in the following examples.

EXAMPLES

All samples described in this disclosure were fabricated with DC magnetron sputtering except carbon films were made with AC magnetron sputtering.

Figure 5:
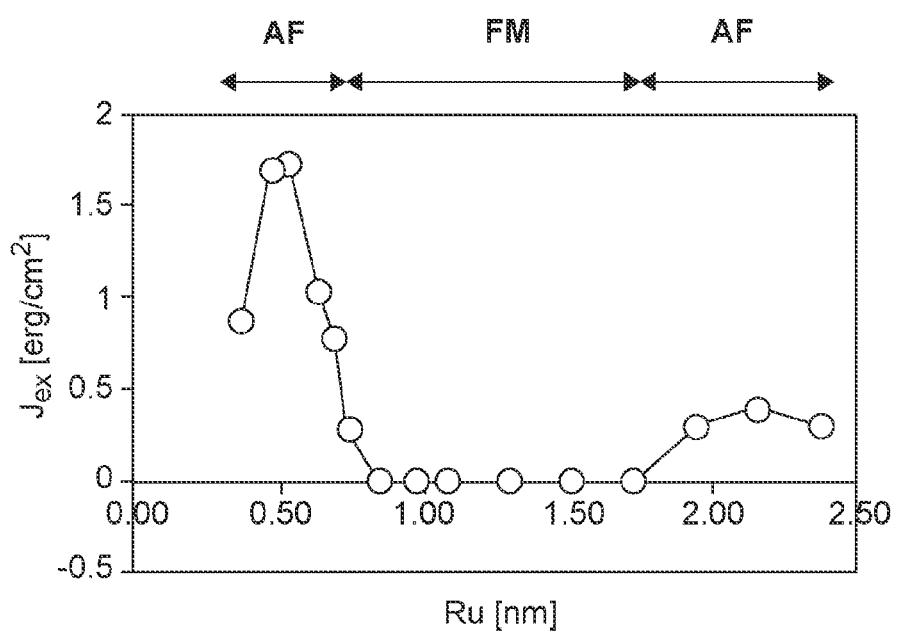
FIG. 5 shows RKKY coupling between FeCoB layers as a function of Ru thickness in an embodiment of this invention.

The applicants investigated perpendicular granular media with AFC SUL structure: FeCoB[57 nm]/Ru/FeCoB[57 nm]/Cu/IL/Mag, where Ru thickness was varied from 0 to 2.2 nm and found that the RKKY coupling between FeCoB layers was a function of Ru thickness as shown in FIG. 5. FIG. 5 describes how $J_{ex}$ varies with Ru thickness. So anti-ferromagnetic coupling can be achieved from 0.3±0.2 to 0.9±0.2 nm and from 1.7±0.2 to about 2.6±0.2 nm for used sputtering conditions. However, if the sputtering conditions are changed, for example Ar sputtering pressure is increased the interface roughness changes leading to different Ru thickness values for which ferromagnetic layers in SUL are anti-ferromagnetically coupled. For this reason I would claim any Ru thickness for which ferromagnetic layers in SUL are anti-ferromagnetically coupled.

Origin of RKKY interaction is polarization of conducting electrons induced by localized spin. Atoms of magnetic layers at the interface with non-magnetic layer (localized spins on the interface) polarize conducting electrons in non-magnetic layer. Depending on the thickness of non-magnetic layer, exchange interaction can vary from ferromagnetic to anti-ferromagnetic as shown in FIG. 5. Exchange is largely a nearest-neighbor phenomenon that occurs across distances typical of the distance between atoms in a solid (a few angstroms). If there is one atomic spacer layer of one material between two magnetic layers, then that may be enough (though a thicker spacer layer could also by used) to destroy or further stabilize the exchange between the two magnetic layers separated by the spacer layer.

Figure 6:
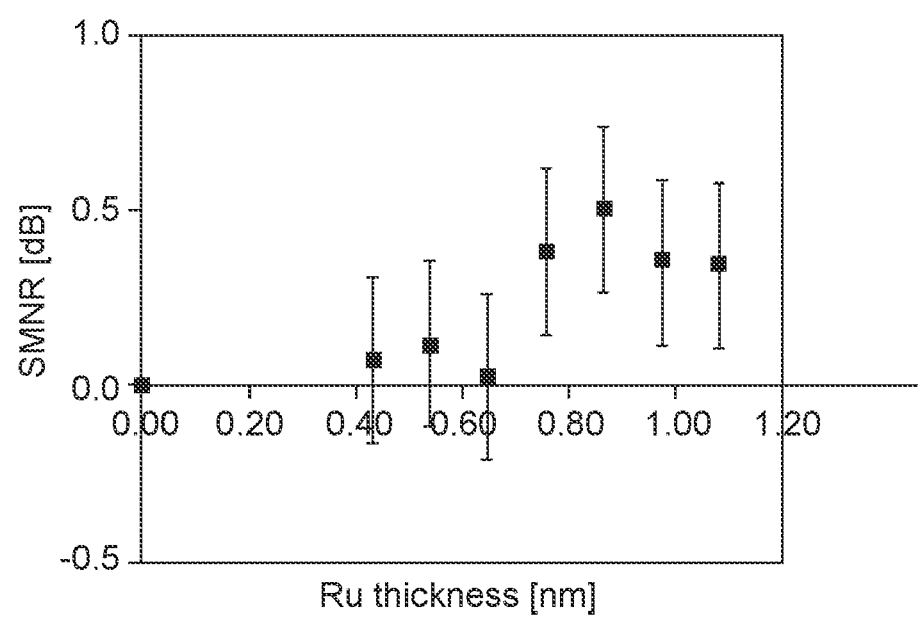
FIG. 6 shows that the recording performance of media of an embodiment of this invention does not deteriorate if a Ru spacer layer thickness is below 1.1 nm.

FIG. 6 is a plot of SMNR versus Ru layer thickness, showing that the recording performance of the media does not deteriorate if the Ru thickness is below 1.1 nm.

Figure 7:
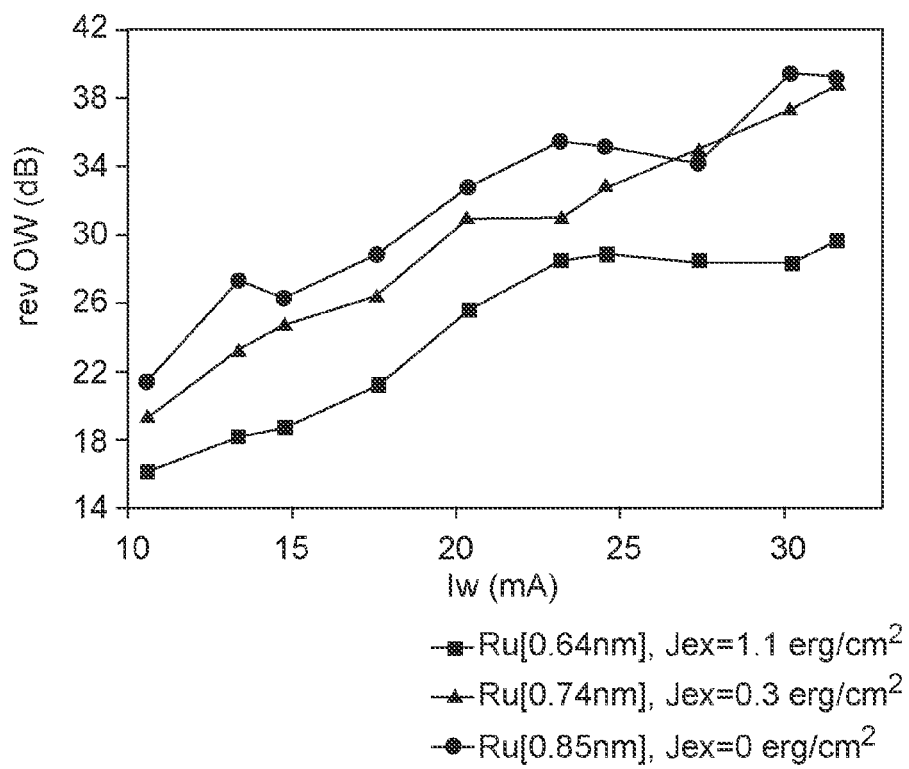
FIG. 7 shows that overwrite in media of an embodiment of this invention decreases if anti-ferromagnetic coupling between FeCoB layers increases.

FIG. 7 is a plot of overwrite as a function write current SUL having different AFC, showing that overwrite in the media decreases when the anti-ferromagnetic coupling between the SUL layers of FeCoB increases.

Figure 8:
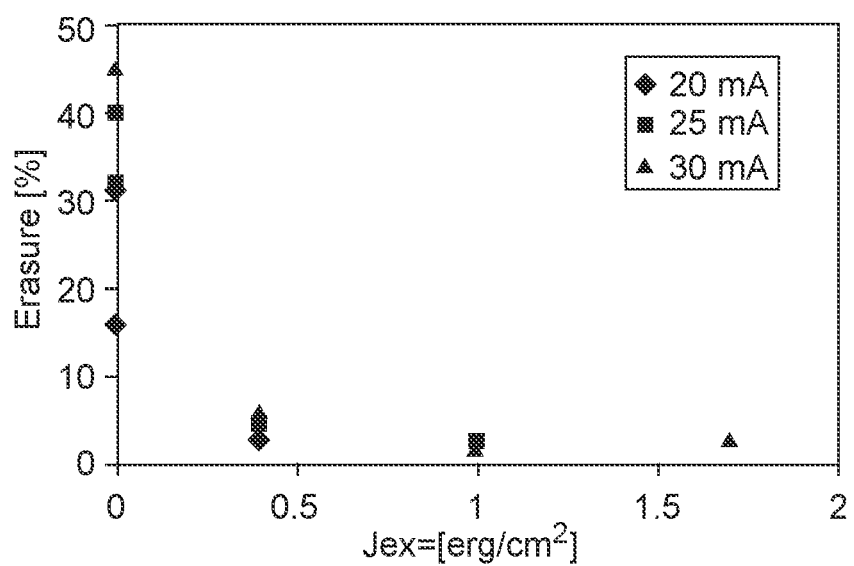
FIG. 8 shows that erasure of media of an embodiment of this invention improves significantly if anti-ferromagnetic coupling between FeCoB layers increases.

FIG. 8 is a plot of erasure as a function of anti-ferromagnetic coupling defined in terms of $J_{ex}$ (erg/cm$^2$), showing that erasure of the media improves significantly if anti-ferromagnetic coupling between the soft underlayers of FeCoB layer increases.

Thus, this invention demonstrates that coupling between FeCoB layer is an important parameter for preventing erasure, and the presence of interface layers may be important for adjusting optimum recording performance.

Figure 9:
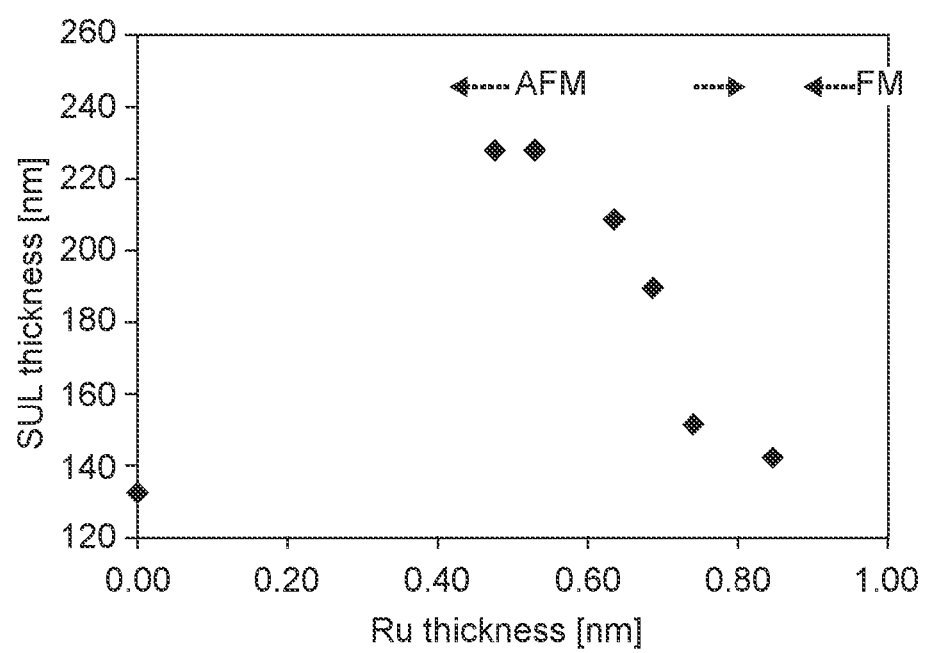
FIG. 9 shows critical thickness without stripe domains of the soft underlayer as function of a Ru layer spacer layer thickness in an embodiment of this invention.

The applicants further investigated perpendicular granular media with AFC SUL structure: FeCoB[y]/Ru/FeCoB[y]/Cu/IL/Mag, where Ru thickness x was varied from 0 to 0.8 nm and FeCoB thickness varied from 56 to 130 nm. If the thickness of single FeCoB layer exceeded 125 nm, the applicants observed stripe domains in FeCoB layer. The thickness at which stripe domains are formed is called a critical thickness for the formation of stripe domain. When the applicants inserted about 0.85 nm thick Ru layer in-between two FeCoB layers the critical thickness of each FeCoB layer was 70 nm. Note that if the Ru thickness was about 0.85 nm, RKKY coupling between FeCoB was negligible. On the other hand, when applicants inserted about 0.5 nm thick Ru layer in-between two FeCoB layers the critical thickness of each FeCoB layer was 115 nm. This increase in critical thickness was due to a large anti-ferromagnetic coupling between FeCoB layers across 0.5 nm Ru spacer layer. Thus, applicants demonstrated that AFC SUL can be used to increase total SUL thickness with anti-ferromagnetic coupling without formation of stripe domains decreasing the Ru layer thickness as shown in FIG. 9.

Figure 10:
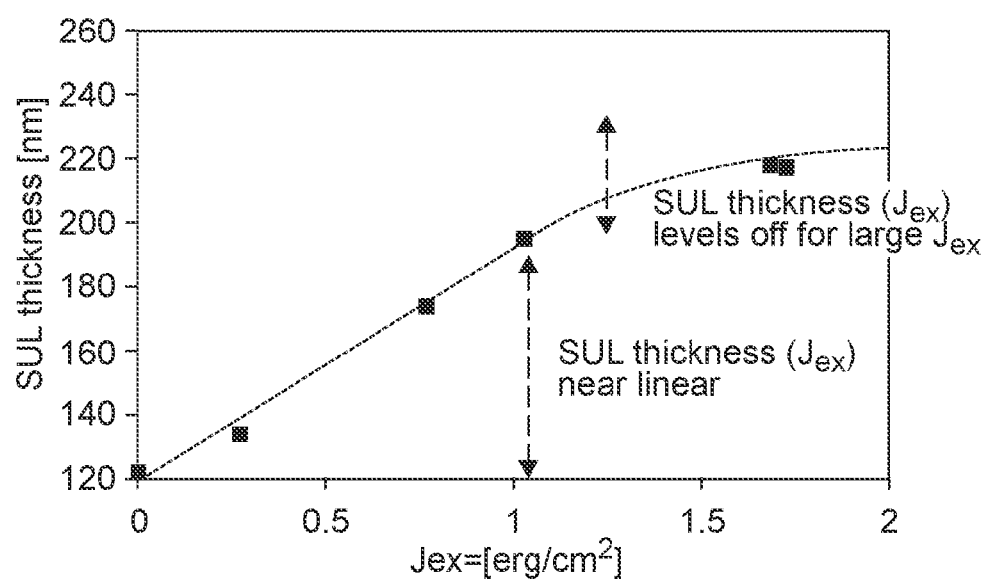
FIG. 10 is a plot of the critical SUL thickness without stripe domains as a function of AFC defined in terms of $J_{ex}$.

In FIG. 10, applicants have plotted the critical SUL thickness without stripe domain as a function of AFC defined in terms of $J_{ex}$. FIG. 10 shows that the critical SUL thickness is initially linear with $J_{ex}$ but then levels off for large $J_{ex}$.

This application discloses several numerical range limitations that support any range within the disclosed numerical ranges even though a precise range limitation is not stated verbatim in the specification because this invention can be practiced throughout the disclosed numerical ranges. Finally, the entire disclosure of the patents and publications referred in this application are hereby incorporated herein in entirety by reference.

The invention claimed is:

1. A perpendicular magnetic recording medium, comprising:
a substrate; an antiferromagnetically coupled soft magnetic underlayer on the substrate; and a recording layer on the soft magnetic underlayer; wherein the soft magnetic underlayer comprises:

$FML_i/[SL_i/FML_{i+1}]_n$ wherein
$FML_i$ and $FML_{i+1}$ are ferromagnetic layers, wherein at least one of the ferromagnetic layers is amorphous,
$SL_i$ is a nonmagnetic spacer layer, and
n=2 to 20; and
wherein the thickness of the nonmagnetic spacer layers $SL_i$ is selected such that a gradient of antiferromagnetic coupling strength, $J_{ex(i)}$, between $FML_i$ and $FML_{i+1}$, varies from weak proximal the recording layer to strong proximal the substrate.

2. The perpendicular magnetic recording medium of claim 1, wherein the underlayer comprises:

$FML_i/IFL_i/[SL_i/IFL_{i+1}/FML_{i+1}]_n$ wherein $IFL_i$ and $IFL_{i+1}$ are interface layers selected from the group consisting of Co, Fe, B, P, Si, C, Zr, Nb, Hf, Ta, Al, Cu, Ag, Au and alloys thereof.

3. The perpendicular magnetic recording medium of claim 1, wherein the spacer layers are Ru.

4. The perpendicular magnetic recording medium of claim 1, further comprising an interlayer between the underlayer and the magnetic recording layer.

5. The perpendicular magnetic recording medium of claim 1, further comprising an adhesion layer between the substrate and the underlayer.

6. The perpendicular magnetic recording medium of claim 1, further comprising a carbon layer on the magnetic recording layer.

7. The perpendicular magnetic recording medium of claim 1, wherein the ferromagnetic layers in the underlayer are amorphous.

8. The perpendicular magnetic recording medium of claim 1, wherein the thickness of each of the ferromagnetic layers in the underlayer is in a range of about 40 to 150 nm.

9. The perpendicular magnetic recording medium of claim 8, wherein the ferromagnetic layers in the underlayer comprise a Fe-containing alloy of a material selected from the group consisting of Co, B, P, Si, C, Zr, Nb, Hf, Ta, Al, Si, Cu, Ag, Au, Nd, Sm, Tb, Dy, Ho and combinations thereof.

10. The perpendicular magnetic recording medium of claim 1, wherein the thickness of the spacer layers is in a range of about 0.1 to 4 nm.

11. The perpendicular magnetic recording medium of claim 10, wherein the spacer layers comprise a material selected from the group consisting of Ru, Rh, Ir, Cr, Cu, Re, V and combinations thereof.

12. A method of manufacturing a perpendicular recording medium, comprising
depositing on a substrate the amorphous soft magnetic underlayer of claim 1; and
depositing on the underlayer a recording layer.

13. The method of claim 12, wherein the thickness of each of the ferromagnetic layers in the underlayer is in a range of about 40 to 150 nm.

14. The method of claim 13, wherein the ferromagnetic layers in the underlayer comprise a Fe-containing alloy of a material selected from the group consisting of Co, B, P, Si, C, Zr, Nb, Hf, Ta, Al, Si, Cu, Ag, Au, Nd, Sm, Tb, Dy, Ho and combinations thereof.

15. The method of claim 12, wherein the thickness of the spacer layers is in a range of about 0.1 to 4 nm.

16. The method of claim 15, wherein the spacer layers comprise a material selected from the group consisting of Ru, Rh, Ir, Cr, Cu, Re, V and combinations thereof.

* * * * *